US006540847B1

(12) United States Patent
Beswick

(10) Patent No.: US 6,540,847 B1
(45) Date of Patent: Apr. 1, 2003

(54) ROLLING STRUCTURE STEEL

(75) Inventor: John Michael Beswick, Montfoort (NL)

(73) Assignee: SKF Engineering & Research Centre B.V., Nieuwegin (NL)

( * ) Notice: Subject to any disclaimer, the term of this patent is extended or adjusted under 35 U.S.C. 154(b) by 0 days.

(21) Appl. No.: 09/980,715

(22) PCT Filed: Jun. 15, 2000

(86) PCT No.: PCT/NL00/00415

§ 371 (c)(1),
(2), (4) Date: Dec. 5, 2001

(87) PCT Pub. No.: WO00/79016

PCT Pub. Date: Dec. 28, 2000

(30) Foreign Application Priority Data

Jun. 17, 1999 (NL) .............................................. 1012382

(51) Int. Cl.$^7$ .............................. C22C 38/22; C21D 9/36
(52) U.S. Cl. ........................ 148/334; 148/335; 148/906; 148/663; 384/492; 384/912
(58) Field of Search ................................ 148/334, 335, 148/906, 663; 420/99, 105; 384/492, 912

*Primary Examiner*—Deborah Yee
(74) *Attorney, Agent, or Firm*—Oliff & Berridge, PLC

(57) ABSTRACT

Rolling structure steel, comprising: 0.90–100% by wt. C; 0.95–1.05% by wt Si; 0.25–0.45% by wt Mn; 0.015% by wt. S max.; 0.025% by wt. P max.; 1.30–1.50% by wt. Cr, and 0.17–0.20% by wt. Mo. Preferably this steel is produced by austenising at 860+20° C., quenched in oil and tempered at 240+20° C. In this way steel is obtained having a high rolling contact fatigue strength and dimensional stability at elevated temperature operating conditions.

10 Claims, 3 Drawing Sheets

ROLLING STRUCTURE STEEL

Figure 1:
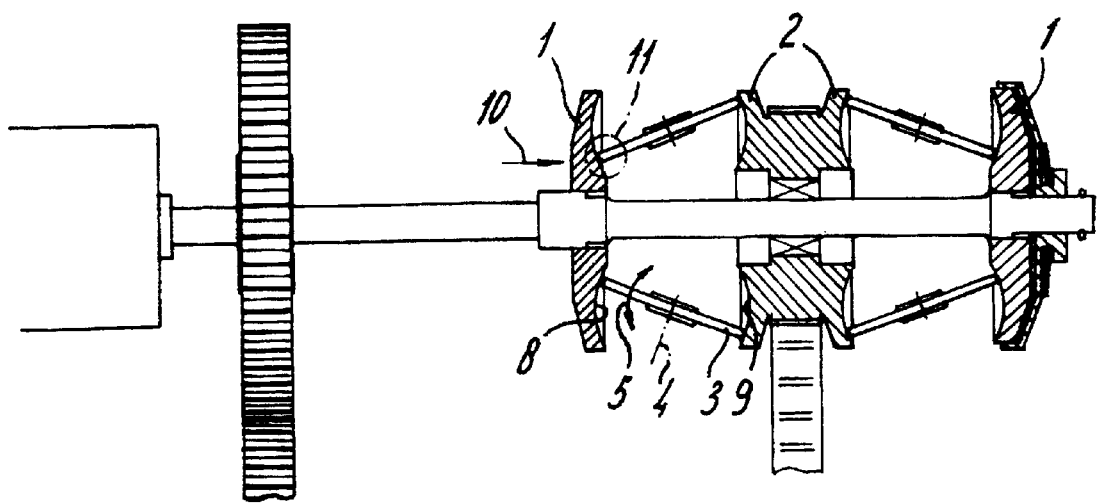

The invention relates to a method for producing a rolling structure steel component.

Rolling structure is meant to encompass both rolling bearings and other parts of rolling structures, such as CVT and IVT disks and power rollers.

Such a steel is known and is for example described in the introduction of U.S. Pat. No. 4,992,111. This steel is known to have an improved bearing fatigue strength life. The high silicon content is restricted because of its costs and the probability of graphitisation problems during spheroidisation. Chromium is present for through hardening with a minimum of 1.30% by wt.

EP0721996A1 discloses in a very general way the composition for a high carbon bearing steel. Ranges given are generally broad, making it impossible to choose a specific composition.

For many applications it is a desire to decrease the size of components and structures. For example this is shown in the wheel bearing designs of a motor vehicle. The first step is to integrate to brake disk support and angular contact hub unit ball bearing. This is realised by selective surface induction hardening to obtain on the one hand sufficient hardness of the related raceways and on the other hand, sufficient toughness of the hub unit to take the drive and brake loads of the vehicle. However, further decreasing of such component will decrease the surface available for exchanging heat with the surroundings. This will result in an increased temperature of the related component.

A further example of increased temperature is due to down sizing of deep groove ball bearings in compact alternators.

Another example wherein higher temperatures usual are found is in IVT discs and power rollers. The maximum contact stress in these components can be as high as 4 GPa, which is far too high for known rolling bearing steels and the discs and power rollers would be succeptible to flaking at these stress levels. An example of such an IVT-transmission is given in the figures. In summary, the IVT must be designed for:

high contact fatigue strength,
high static load capacity,
high structural fatigue strength and fatigue crack arrest properties;
dimensional stability i.e. resistant to growth and axial clearance increase,
elevated temperature capability,
high tolerance to vibratory loads, and
resistance to false brinelling.

The invention aims to provide a steel as well as a method for producing components thereof, having a high surface strength and tough core with a high yield strength, stable microstructure with an elevated temperature capability.

According to the invention this is realized with a method for producing a rolling structure steel component, comprising 0.90–1.00% by wt. C; 0.95–1.05% by wt. Si, 0.25–0.45% by wt. Mn; 0.015% by wt S max., 0.025% by wt. P max.; 1.30–1.50% by wt. Cr and 0.17–0.25% by wt. Mo, balance Fe and impurities, wherein said steel component is through hardened by austenisation at 860±20° C., and tempered at 250±20° C.

Surprisingly, it has been found that the combination of silicon and molybdenum increases the high temperature rolling contact fatigue strength. A steel having this composition surprisingly does not show graphitisation problems in view of the high carbon percentage. Probably this is due to the narrow range of the silicon content. Because of the well defined Mo content, segregation is kept as reduced as possible.

Because it has been found that if the molybdenum content is too high in combination with high carbon excessive segregation is produced during liquid steel solidification in casting, an upper limit of 0.20% by wt. molybdenum. The higher molybdenum content is possible but will require longer homogenisation treatments and/or result in lost of hot workability during the steel making and hot forming operations for the manufacturing of rolling bearing and IVT components.

According to a further preferred embodiment of the invention 0.25% by wt. Ni or less is provided. Also, preferably 0.30% by wt. Cu or less is present. According to a further preferred embodiment 30 ppm Ti or less is present in the steel and the same applies to oxygen which should be present with 10 ppm at max. According to the invention selective surface hardening and more particular induction hardening can be used for selected surface areas.

The invention will be further elucidated referring to the enclosed figures in

Figure 2:
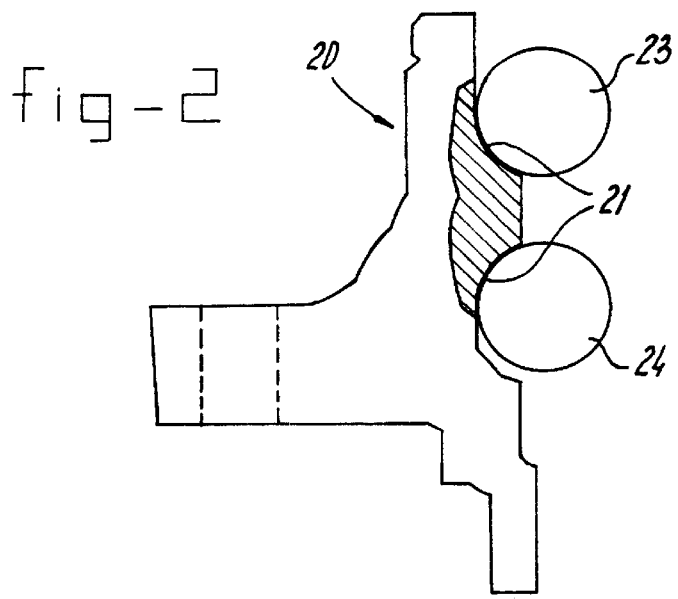
Figure 3A:
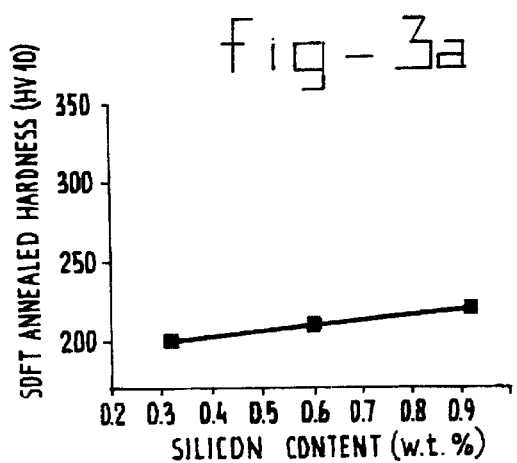
Figure 3B:
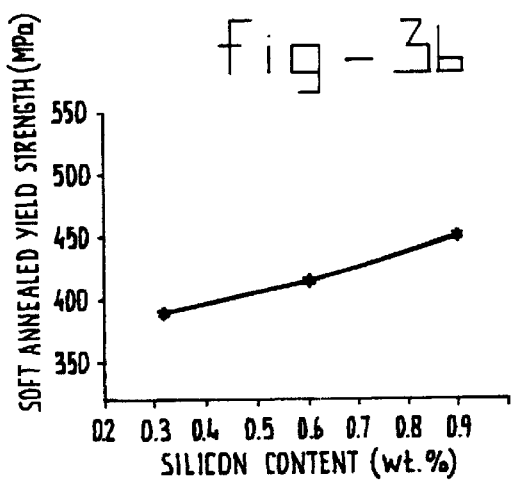
Figure 3C:
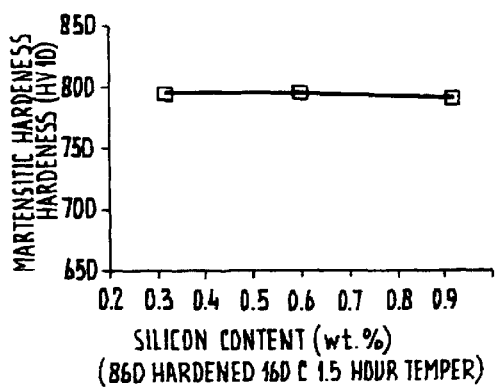
Figure 3D:
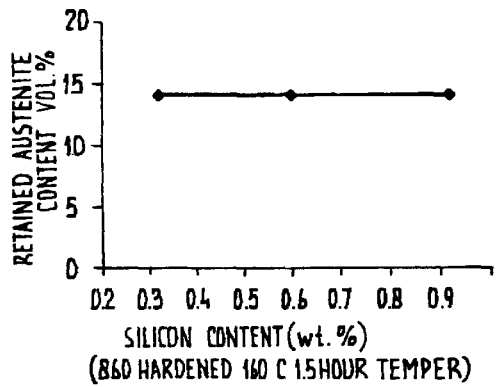

FIG. 1 schematically shows an example of a IVT;

FIG. 2 schematically shows part of a wheel bearing;

FIGS. 3a–d show graphs in which the effect of silicon additions is indicated; and FIG. 4 shows in a graph the effect of silicon addition, in martensitic hardened steel.

In FIG. 1 an example of an IVT is given. In the most general embodiment the IVT comprises input disks 1 connected to the output shaft of an engine and an opposed output disk 2 connected to a drive chain or further gear box components of a vehicle or any other item which has to be driven with a variable ratio. In between are a number of power rollers 3. Power rollers 3 can be journalled on any shaft and the axis thereof is indicated by 4. This shaft can make a rotational movement in the sense of arrow 5. Through rotation of other rollers in the sense of arrow 5 the transmission ratio between the input and output disk will change. As shown in FIG. 1 power roller 3 engages the input disk near its centre line whilst the output disk is engaged remote from this centre line. There is a pressure force clamping the circumferential surface of the power rollers to the raceway 8 of the input disk and the raceway 9 of the output disk respectively. This clamping force is schematically referred to by arrows 10. The IVT shown in FIG. 1 is also known as 'Torotrak IVT'. Other means are also used in the art but for all embodiments it is essential that at least three power rollers are provided which make some tilting movement according to arrow 5 in order to change the ratio of transmission between an input and an output disk. It has been shown that such structure can give a 15% increased efficiency as compared to conventional automatic transmissions. In contrast to rolling bearing there is no lubrication film between the adjacent components of the structure.

The circumferential surface of each power roller as well as the raceways 8 and 9 are subjected to considerable loadings. Probably this is one of the reasons that up to now this technique was not generally accepted. For example, the maximum contact stress between the circumferential surface of the power rollers and the related raceway could be as high as 4 GPa. This is far higher than the contact pressure encountered in usual rolling bearings. Furthermore, the tilting movement according to arrow 5 introduces slip of the rollers relative to the disks. Such a slip is not present in rolling bearings. Fatigue cracking and fracture due to repetitive bending stresses have been reported. The area of the disk within circle 11 is particular vulnerable. This means that the combined rolling contact fatigue strength of the traction surfaces (raceways) and fatigue fracture strength should be improved. Below a very schematic overview of the loading of the several components of the IVT transmission is given.

| IVT-Components | ~Characteristics | Failure Mode |
|---|---|---|
| Input Disk-Sline Connection | Torsional load at spline radii | Structural fatigue cracking |
| Input disk against power roller via traction fluid to stop slippage | Up to ~3.5 GPa contact pressure | •Rolling contact fatigue spalling<br>•Surface distress<br>•Structural load accelerated contact fatigue |
| Power rollers | Up to ~3.5 GPa contact pressure | •Rolling contact fatigue spalling<br>•Surface distress |
| Significant clamping forces across disk & power rollers via hydraulic piston | Bending structural stress | Structural fatigue cracking |
| Drive disk via chain sprocket | Bending forces at output drive | Bending fatigue cracks |
| Disk & power rollers | High temperatures (up to ~120.° C.) and structural stresses | Growth & axial clearance increase |
| Disk & power rollers | Vibratory loads | Accelerated structural fatigue cracking |

In FIG. 2 part of a wheel hub is shown. The flange to which a wheel and brake disk is have to be connected is referred to by 20. The ball bearing face has reference 21 and the balls heaving given numbers 23 and 24. In the hatched area of the raceway a relatively high contact fatigue strength is present. The flange itself should be made from a material which has a considerable yield strength, toughness and structual fatigue strength. Overall high requirements are set with regard to the resistance to axial clearance increase after prolonged use. Adjusting of wheel bearings is not longer acceptable and during the service life of the related vehicle there should not be any substantial increase in axial clearance.

According to the invention the requirements set to both types of rolling structures are met with a steel comprising
  0.9–1.00% by wt. C;
  0.95–1.05 by wt. % Si;
  0.25–0.45% by wt. Mn;
  0.015% by wt. S max.;
  0.025% by wt. P max.;
  1.30–1.50% by wt. Cr, and
  0.17–0.20% by wt Mo.

FIG. 3 shows the increased strength due to silicon additions. The core strength will increase and it is possible to realise a selective surface induction heat treatment of soft annealed steel. The yield is a significant design requirement for surface induction hardening steel.

Figure 4A:
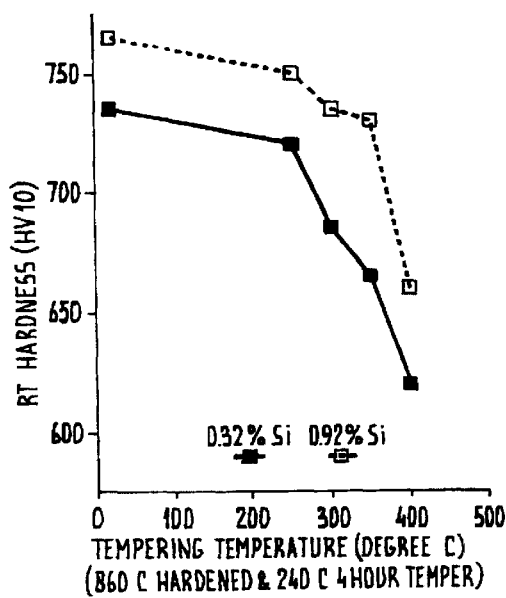
Figure 4B:
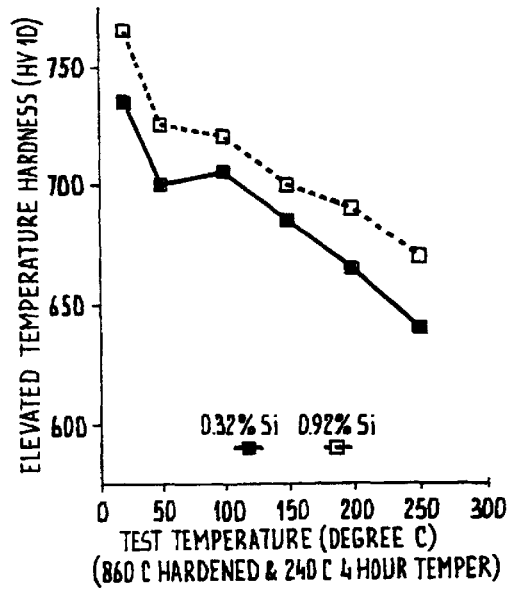

The beneficial effect of silicon in combination with molydenum on the through martensitic hardened steel and elevated temperature hardness retention is shown in FIGS. 4a and 4b. These figures shows the effect of silicium additions to martensitic hardened steel comprising: 0.95% by wt C; 0.36% by wt Mn; 1.73% by wt Cr and 0.32% by wt Mo, both for 0.32% by wt Si and 0.92% by wt Si.

Although the invention has been described above referring to preferred applications of the steel, it should be understood that a steel according to the invention can be used in any component of any rolling structure, such as rolling bearings, CVT disk power rollers and CVJ ball joints. According to the invention the rolling contact fatigue strength is considerably improved at higher temperatures (above 150° C.).

The steel according to the invention is through hardened or surface hardened according to a preferred embodiment.

The same applies for a tempering treatment which is preferably at 240±5° C. and depending of the size of the related item will be about four hours.

Although the invention has been described relating to preferred embodiments of the invention the scope of protection is not restricted thereto, but comprises all embodiments within the range of the enclosed claims.

I claim:

1. Method for producing a rolling structure steel component, comprising 0.90–100% by wt. C; 0.95–1.05% by wt. Si, 0.25–0.45% by wt. Mn; 0.015% by wt. S max., 0.025% by wt. P max.; 1.30–150% by wt. Cr and 0.17–0.25% by wt. Mo, balance Fe and impurities, wherein said steel component is through hardened by austenisation at 860±20° C., and tempered at 250±20° C.

2. Method according to claim 1, wherein said steel component is austenised at 860±5° C.

3. Method according to claim 1, wherein said steel component is quenched in oil.

4. Method according to claim 1, wherein said steel component is tempered at 240±5° C.

5. Method according to claim 1 wherein selective areas of the surface are hardened.

6. Rolling structure steel produced with the method according to claim 1, comprising 0.18–0.20% by wt. Mo.

7. Rolling structure steel according to claim 6, comprising 0.25% by wt. Ni or less.

8. Rolling structure steel according to claim 6, comprising 0.30% by wt. Cu or less.

9. Rolling structure steel according to claim 6, comprising 30% ppm Ti or less.

10. Rolling structure steel according to claim 6, comprising 10 ppm O or less.

* * * * *